(12) United States Patent
Simpson et al.

(10) Patent No.: US 10,828,586 B2
(45) Date of Patent: Nov. 10, 2020

(54) FILTER ASSEMBLY FOR A REFRIGERATOR APPLIANCE

(71) Applicant: Haier US Appliance Solutions, Inc., Wilmington, DE (US)

(72) Inventors: Sean Simpson, Charlottesville, VA (US); Gregory Sergeevich Chernov, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 77 days.

(21) Appl. No.: 16/171,571

(22) Filed: Oct. 26, 2018

(65) Prior Publication Data

US 2020/0129898 A1    Apr. 30, 2020

(51) Int. Cl.
   *B01D 35/30* (2006.01)
   *C02F 1/00* (2006.01)

(52) U.S. Cl.
   CPC ............ *B01D 35/306* (2013.01); *C02F 1/003* (2013.01); *B01D 2201/307* (2013.01); *F25D 2323/121* (2013.01)

(58) Field of Classification Search
   CPC . B01D 35/306; B01D 2201/307; C02F 1/003; C02F 2307/12; C02F 2201/006; F25D 2323/121; F25D 23/126
   See application file for complete search history.

(56) References Cited

U.S. PATENT DOCUMENTS

| 9,157,677 | B2 | 10/2015 | Mitchell | |
|---|---|---|---|---|
| 9,393,507 | B2 | 7/2016 | Nuss | |
| 2012/0210740 | A1 | 8/2012 | Kim | |
| 2012/0285192 | A1* | 11/2012 | Mitchell | B01D 27/00 62/318 |

* cited by examiner

*Primary Examiner* — Ana M Vazquez
(74) *Attorney, Agent, or Firm* — Dority & Manning, P.A.

(57) ABSTRACT

A filter assembly for a refrigerator appliance includes a filter housing and a filter locking mechanism pivotally mounted at least partially within the filter housing. The filter locking mechanism includes a locking arm defining a retention clip and a resilient arm that extends from the locking arm at an extension angle of less than 90 degrees. As a filter cartridge is inserted into the filter housing, the resilient arm acts like a spring to urge the filter cartridge out of the housing. After the filter cartridge passes or engages the retention clip, the spring force from the resilient arm urges the filter cartridge against the retention clip to secure the filter cartridge within the housing.

20 Claims, 7 Drawing Sheets

FILTER ASSEMBLY FOR A REFRIGERATOR APPLIANCE

FIELD OF THE INVENTION

The present subject matter relates generally to refrigerator appliances, and more particularly to filter assemblies for refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

In addition, conventional refrigerator appliances include dispensing assemblies for dispensing liquid water and/or ice, e.g., through a dispenser mounted on a front of the appliance or within the cabinet. These dispensing assemblies typically use one or more water filters to filter water before the water is output to a user or used to make ice. Specifically, water filters remove dirt, sediment, and other contaminants from unfiltered water sources such as, for example, municipal water supplies before dispensing to the end user in the form of water and/or ice.

In many cases, such as in refrigerator appliances, a filter cartridge is installed onto a gravity fed or pressurized water supply line such that water flowing through the water supply line is flowed through filter media contained in the cartridge. However, these filter cartridges must be replaced periodically or the filter media must be otherwise refreshed. Removing these filter cartridges is often a complex and difficult task, requiring excessive force and creating potential for water splashes or leaks.

Accordingly, a refrigerator appliance with an improved water filter assembly would be useful. More particularly, a filter assembly for a refrigerator appliance with features for facilitating the quick and easy removal and replacement of filter cartridges would be particularly beneficial.

BRIEF DESCRIPTION OF THE INVENTION

Aspects and advantages of the invention will be set forth in part in the following description, or may be apparent from the description, or may be learned through practice of the invention.

In a first exemplary embodiment, a refrigerator appliance is provided including a cabinet defining a chilled chamber, a door being rotatably hinged to the cabinet to provide selective access to the chilled chamber, and a filter assembly. The filter assembly includes a filter housing for receiving a filter cartridge and a filter locking mechanism positioned at least partially within the filter housing for securing the filter cartridge, the filter locking mechanism including a locking arm defining a retention clip for securing the filter cartridge and a resilient arm that extends from the locking arm at an extension angle of less than 90 degrees.

According to another exemplary embodiment, a filter assembly for an appliance is provided. The filter assembly includes a filter housing for receiving a filter cartridge and a filter locking mechanism positioned at least partially within the filter housing for securing the filter cartridge, the filter locking mechanism including a locking arm defining a retention clip for securing the filter cartridge and a resilient arm that extends from the locking arm at an extension angle of less than 90 degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
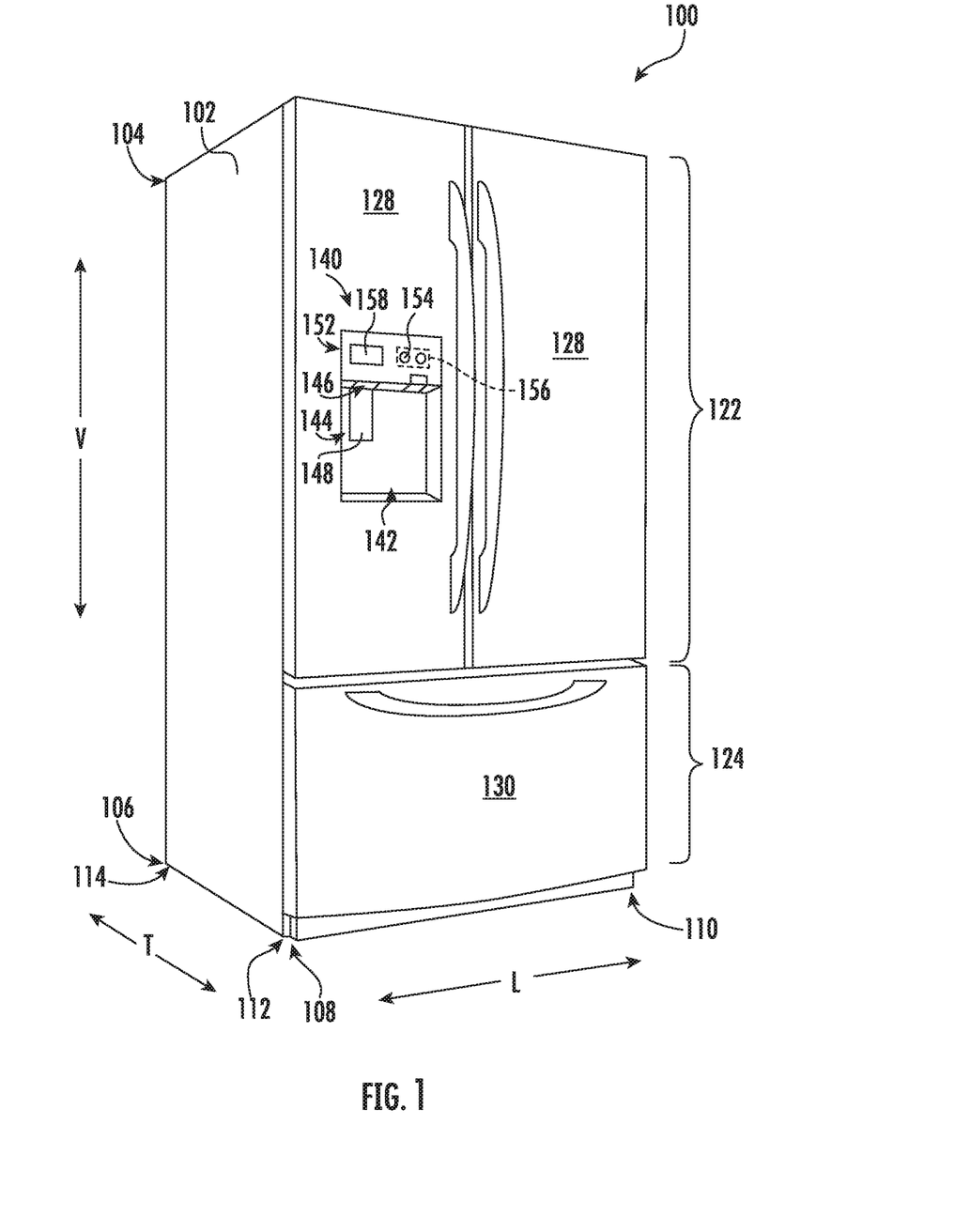
FIG. 1 provides a perspective view of a refrigerator appliance according to an exemplary embodiment of the present subject matter.

FIG. 1 provides a perspective view of a refrigerator appliance 100 according to an exemplary embodiment of the present subject matter. Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Housing 102 defines chilled chambers for receipt of food items for storage. In particular, housing 102 defines fresh food chamber 122 positioned at or adjacent top 104 of housing 102 and a freezer chamber 124 arranged at or adjacent bottom 106 of housing 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Moreover, aspects of the present subject matter may be applied to other appliances as well, such as ovens, microwaves, etc. Consequently, the description set forth herein is for illustrative purposes only and is not intended to be limiting in any aspect to any particular appliance or configuration.

Refrigerator doors 128 are rotatably hinged to an edge of housing 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
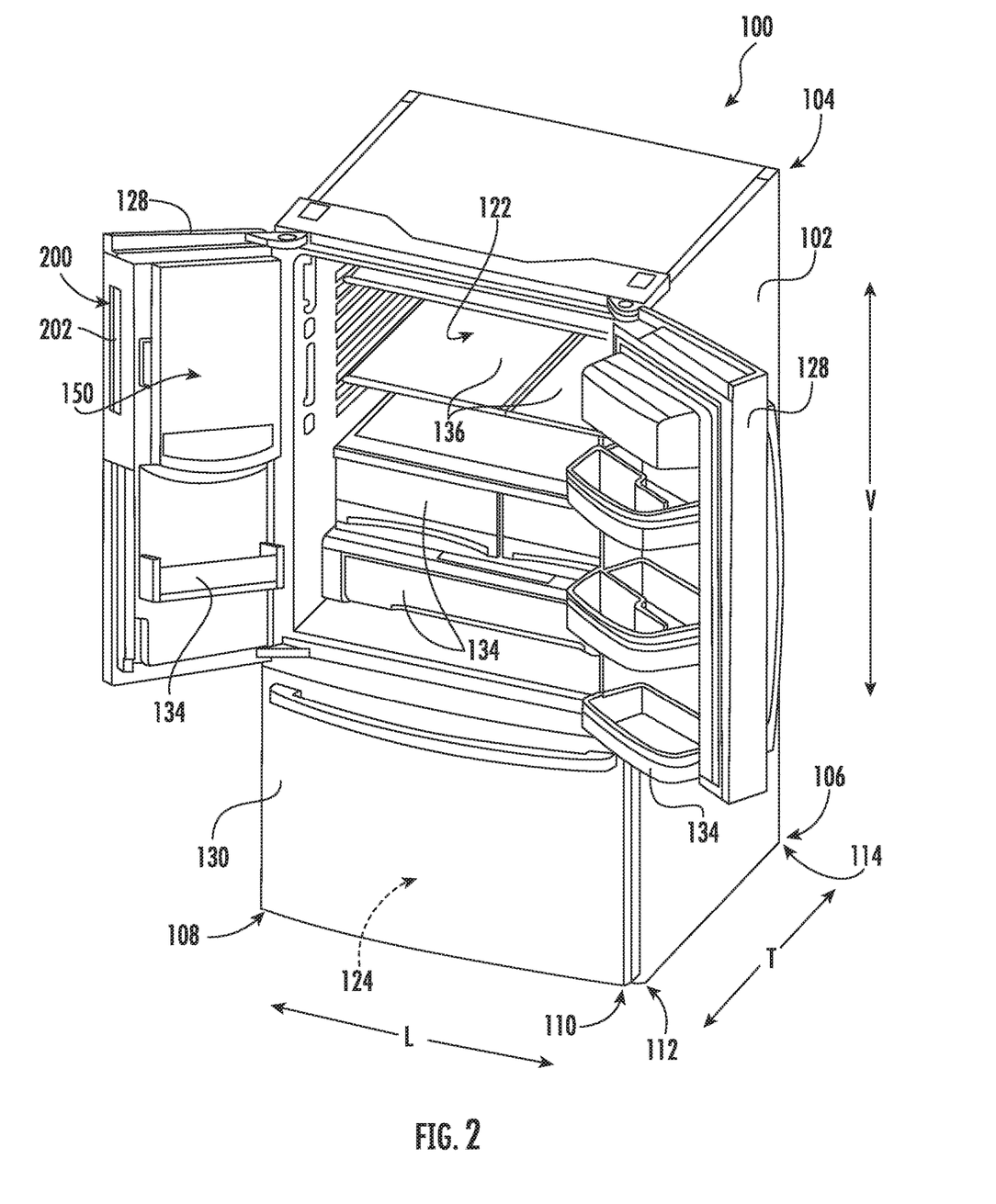
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring again to FIG. 1, a dispensing assembly 140 will be described according to exemplary embodiments of the present subject matter. Although several different exemplary embodiments of dispensing assembly 140 will be illustrated and described, similar reference numerals may be used to refer to similar components and features. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142. By contrast, refrigerator door 128 may define an icebox compartment 150 (FIG. 2) housing an icemaker and an ice storage bin (not shown) that are configured to supply ice to dispenser recess 142.

A control panel 152 is provided for controlling the mode of operation. For example, control panel 152 includes one or more selector inputs 154, such as knobs, buttons, touch-screen interfaces, etc., such as a water dispensing button and an ice-dispensing button, for selecting a desired mode of operation such as crushed or non-crushed ice. In addition, inputs 154 may be used to specify a fill volume or method of operating dispensing assembly 140. In this regard, inputs 154 may be in communication with a processing device or controller 156. Signals generated in controller 156 operate refrigerator appliance 100 and dispensing assembly 140 in response to selector inputs 154. Additionally, a display 158, such as an indicator light or a screen, may be provided on control panel 152. Display 158 may be in communication with controller 156, and may display information in response to signals from controller 156.

As used herein, "processing device" or "controller" may refer to one or more microprocessors or semiconductor devices and is not restricted necessarily to a single element. The processing device can be programmed to operate refrigerator appliance 100, dispensing assembly 140 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 2 through 7, a filter assembly 200 which may be used with refrigerator appliance 100 will be described according to exemplary embodiments of the present subject matter. Specifically, filter assembly 200 may be configured for receiving a filter cartridge 202 for filtering water before use in refrigerator appliance 100. According to the illustrated embodiment, filter assembly 200 is illustrated as being mounted in refrigerator door 128 and may be fluidly coupled to a water supply line (not shown) for receiving and filtering a flow of water before dispensing the water to a user or an ice maker (not shown). Alternatively, filter assembly 200 may be mounted at any other suitable location within refrigerator appliance 100 or may be used in any other suitable refrigerator appliance or in any other application where filtering a fluid may be desirable. The exemplary embodiments described herein are not intended to limit the scope of the present subject matter in any manner.

Figure 3:
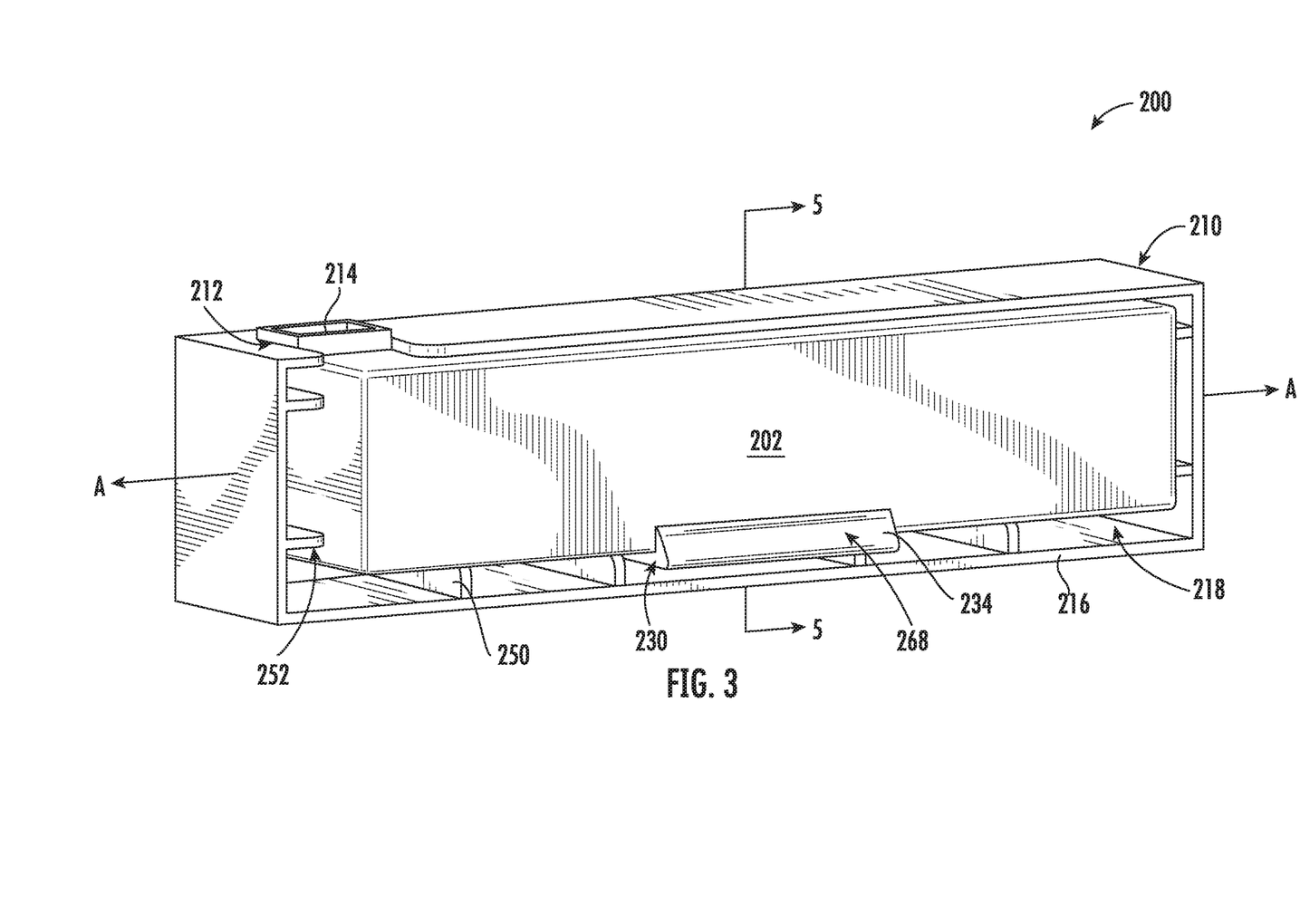
FIG. 3 provides a perspective view of a filter assembly that may be used in the exemplary refrigerator appliance of FIG. 1 according to an exemplary embodiment of the present subject matter.
Figure 4:
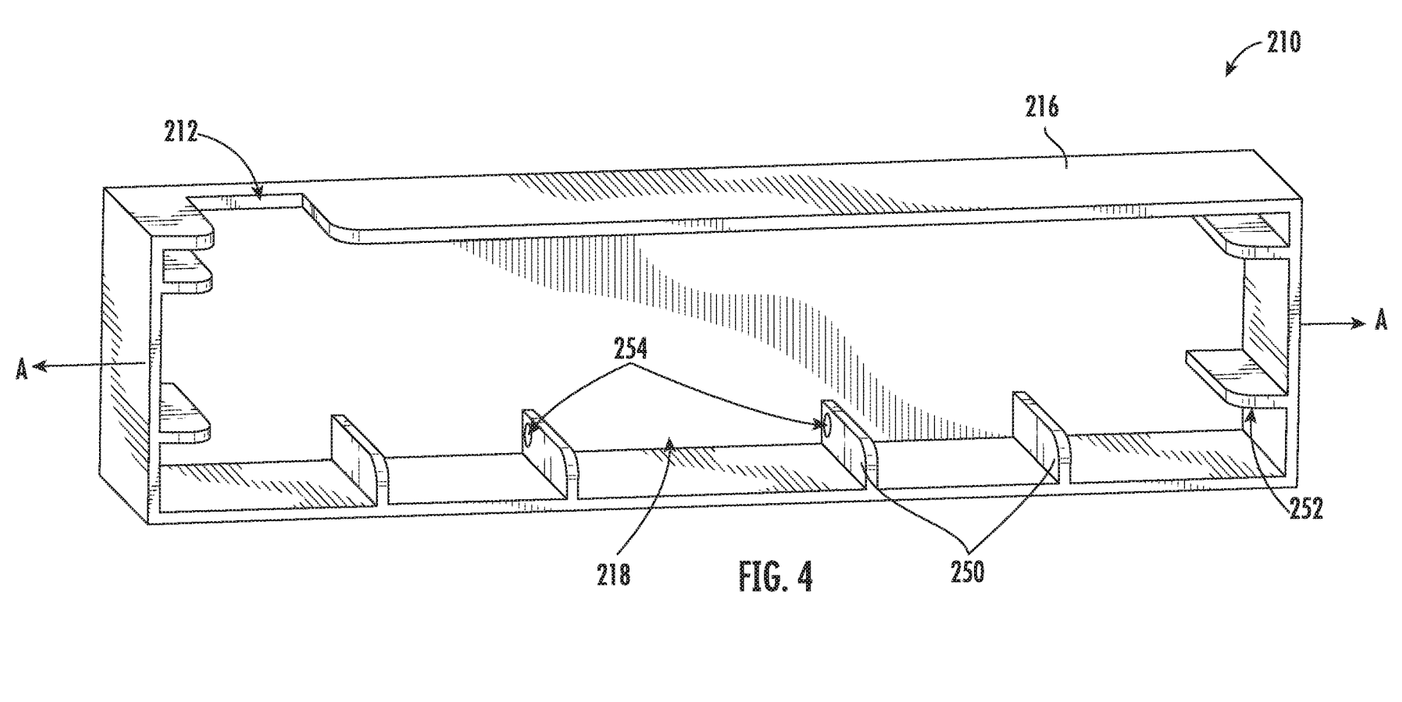
FIG. 4 provides a perspective view of the exemplary filter assembly of FIG. 3, with a filter cartridge removed for clarity.

As best shown in FIGS. 3 through 7, filter assembly 200 may generally include a filter housing 210 for receiving filter cartridge 202. Specifically, filter housing 210 may have a substantially square or rectangular cross-section and may be elongated along a filter axis A. Filter housing 210 may define a docking aperture 212 through which a port 214 of filter cartridge 202 may engage a water supply line. In addition, filter housing 210 may generally include five solid walls 216 (e.g. a bottom wall, a top wall, two sidewalls, and a rear wall, with directional references being based on the orientation of filter housing 210 as shown in FIGS. 3 and 4). Walls 216 of filter housing 210 may generally define a front opening 218 which is configured for receiving filter cartridge 202. In this manner, referring again briefly to FIG. 2, the solid walls 216 of filter housing 210 may be recessed within an aperture in refrigerator door 128 such that a user may insert filter cartridge 202 into refrigerator door 128 such that it sits flush with an external surface of refrigerator door 128.

It should be appreciated that filter housing 210 is used only for the purpose of explaining aspects of the present subject matter and is not intended to be limiting in any manner. For example, filter housing 210 and filter cartridge 202 are illustrated and described herein as having substantially rectangular or square cross-sections. However, it should be appreciated that aspects the present subject matter may also apply to filter housings and/or filter cartridges which have a circular cross-sections or any other suitable cross-sectional shape.

Filter assembly 200 may further include a filter locking mechanism 230 which is positioned at least partially within filter housing 210. Filter locking mechanism 230 is generally configured for securing filter cartridge 202 within filter housing 210. In general, filter locking mechanism 230 is an L-shaped bracket that defines two flaps that are configured to securely receive filter cartridge 202. More specifically, filter locking mechanism 230 includes a first flap or a locking arm 232 that extends substantially parallel to a bottom wall 216 of filter housing 210. In addition, locking arm 232 defines a retention clip 234 which is positioned at its distal end 236 for securing filter cartridge 202, as described in more detail below.

Figure 5:
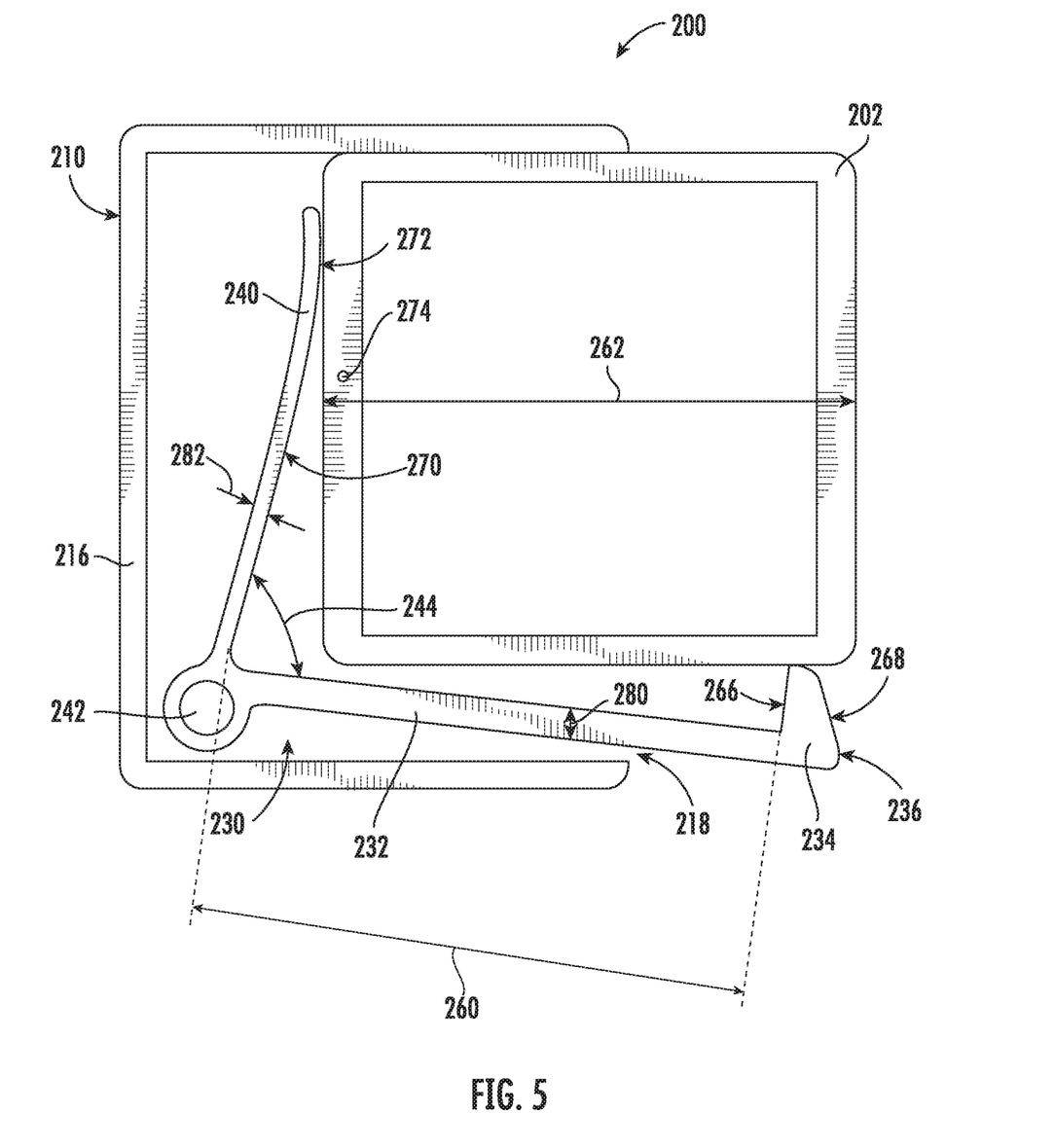
FIG. 5 provides a cross sectional view of the exemplary filter assembly of FIG. 3, taken along Line 5-5 of FIG. 3, wherein the filter cartridge is in an unlatched position.
Figure 6:
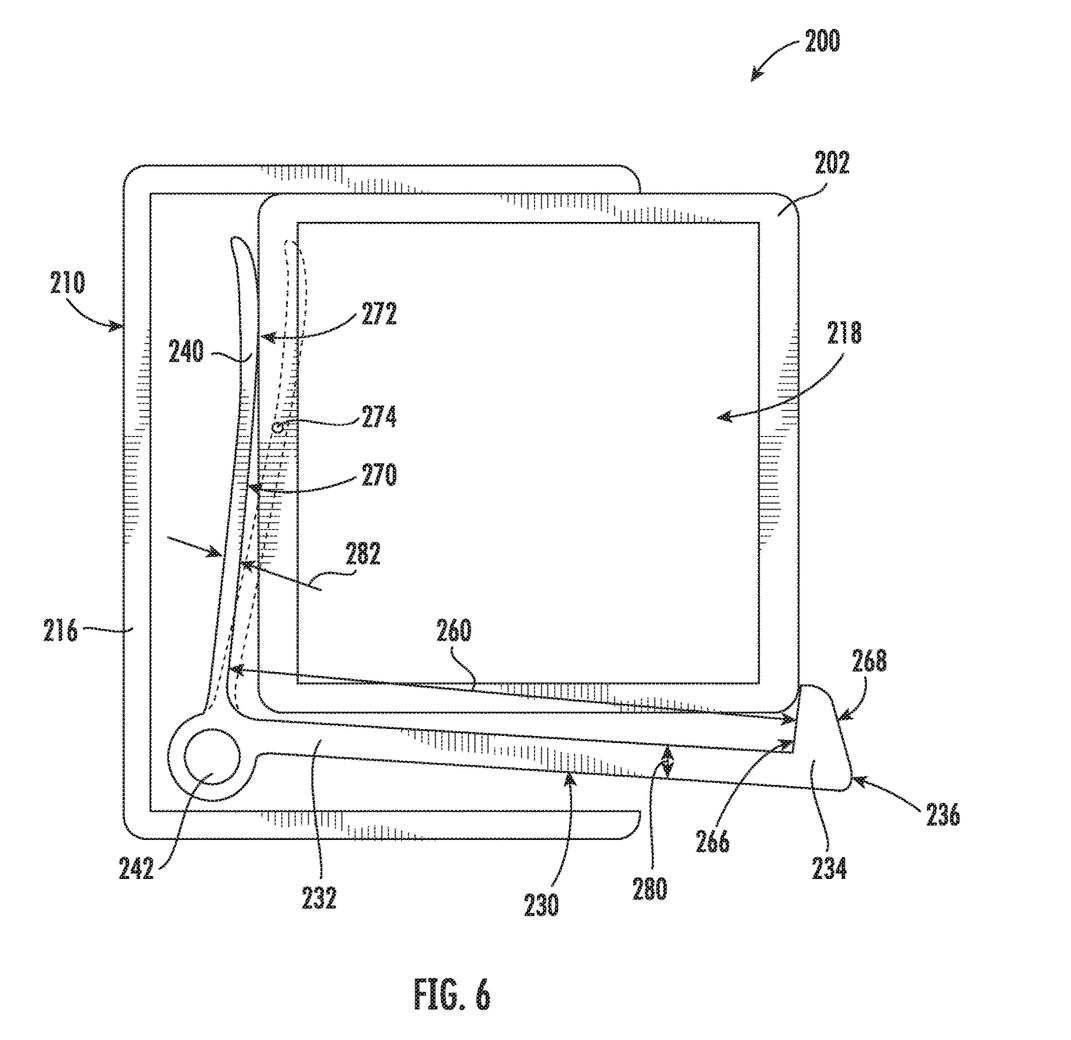
FIG. 6 provides a cross sectional view of the exemplary filter assembly of FIG. 3, wherein the resilient arm is shown in the deflected position as the filter cartridge is moved toward a latched position.
Figure 7:
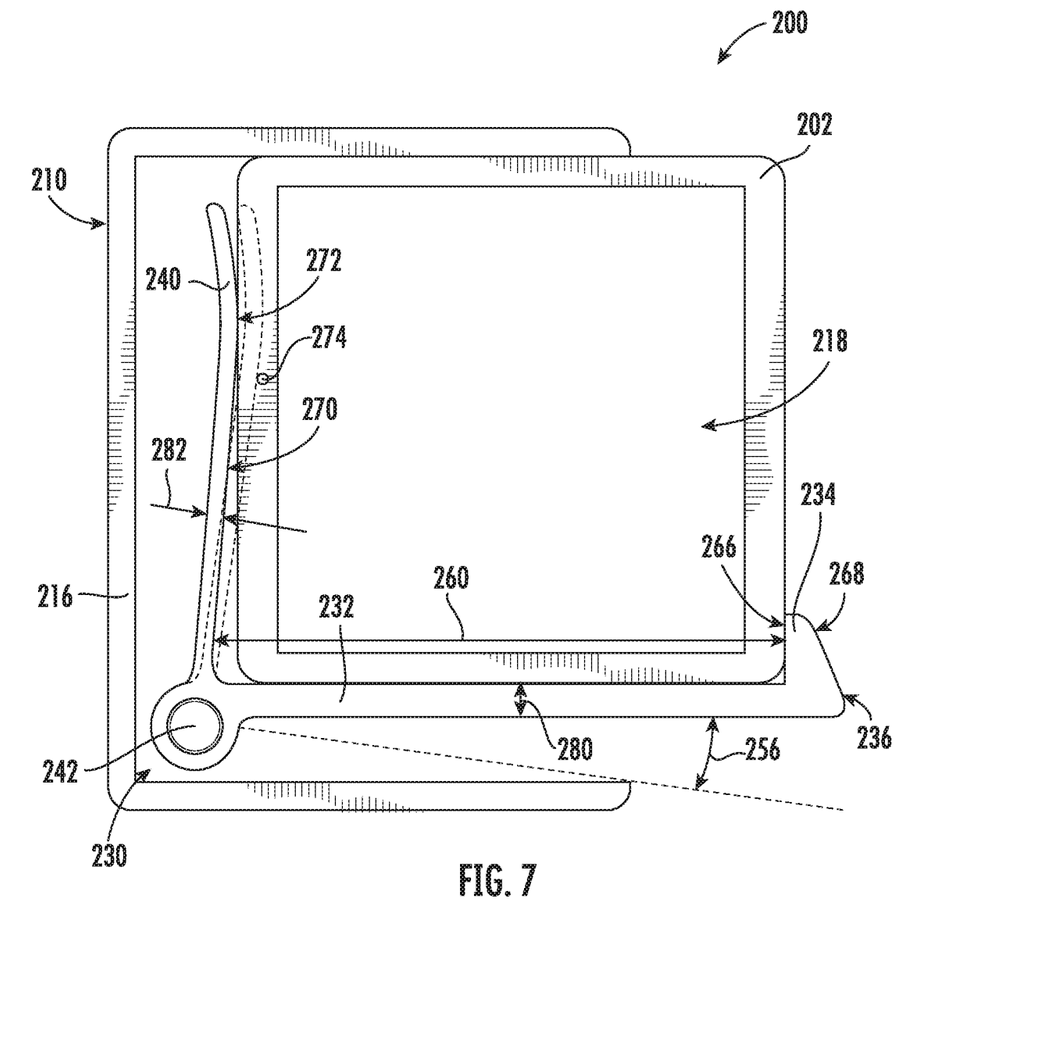
FIG. 7 provides a cross sectional view of the exemplary filter assembly of FIG. 3, wherein the filter cartridge is in the latched position.

In addition, filter locking mechanism 230 includes a resilient arm 240 that extends from locking arm 232. Specifically, according to the illustrated embodiment, locking arm 232 and resilient arm 240 may both extend from a pivot pin 242 out toward their respective distal ends at an extension angle 244 as shown in FIGS. 5 through 7. As used herein, "extension angle" is generally used to refer to an angle defined between locking arm 232 in resilient arm 240 proximate pivot pin 242. In addition, the extension angle 244 generally refers to the relaxed extension angle, e.g., when filter cartridge 202 is not installed. However, it should be appreciated that extension angle 244 varies slightly when filter cartridge 202 is installed, as described in detail below.

According to an exemplary embodiment of the present subject matter, the extension angle 244 is less than 90 degrees. In this manner, when filter cartridge 202 is installed in filter housing 210, filter locking mechanism 230 is distorted or flexes to provide a spring force on filter cartridge 202. According to alternative embodiments, the extension angle 244 may be less than 80 degrees, approximately 75 degrees, or even smaller when in the relaxed position. In general, a smaller extension angle 244 results in a stronger spring force on filter cartridge 202. It should be appreciated that as used herein, terms of approximation, such as "approximately," "substantially," or "about," refer to being within a ten percent margin of error.

According to the illustrated embodiment, pivot pin 242 is rotatably mounted to filter housing 210. Specifically, referring to FIG. 4, filter housing 210 may define a plurality of alignment ribs 250 which extend into filter housing 210 and may generally be configured for securely receiving filter cartridge 202. As shown, alignment ribs 250 may define at least one filleted corner 252 for guiding filter cartridge 202 during the insertion or installation process. Alignment ribs 250 may further define mounting holes 254 for rotatably receiving pivot pin 242. Although alignment ribs 250 are illustrated herein as being used for mounting filter locking mechanism 230 and for permitting the pivoting of filter locking mechanism 230, it should be appreciated that other constructions may be used as well. For example, filter housing 210 could alternatively define a recessed portion in the bottom wall 216 within which filter locking mechanism 230 may be mounted and permitted to pivot slightly.

Referring now briefly to FIG. 7, filter locking mechanism 230 may rotate within filter housing 210 through a pivot angle 256. Pivot angle 256 may be any angle suitable to permit filter cartridge 202 to pass through opening 218. For example, according to the illustrated embodiment, pivot angle 256 is less than about 15 degrees or approximately 10 degrees. Notably, this may be achieved by rotatably mounting filter locking mechanism 230 and spacing locking arm 232 apart from filter housing 210, e.g., from bottom wall 216 as shown in FIGS. 5 through 7. In this manner, as filter cartridge 202 is inserted through opening 218, filter locking mechanism 230 may pivot to lower retention clip 234 and an amount sufficient to permit filter cartridge 202 to pass into filter housing 210 through opening 218.

Referring still to FIGS. 5 through 7, locking arm 232 may define a length 260 that is substantially equivalent to a width 262 of filter cartridge 202 (or slightly larger). Length 260 may be defined as the distance between retention clip 234 and pivot pin 242 (e.g., where resilient arm 240 extends from locking arm 232). Notably, retention clip 234 may extend from distal end 236 of locking arm 232 and may generally define a locking surface 266 that is oriented substantially perpendicular to locking arm 232 and an angled surface 268 that faces away from filter housing 210 for engaging filter cartridge 202 as it is inserted through opening 218.

In addition, according to the illustrated embodiment, resilient arm 240 may be curved to define a convex surface 270 that faces filter cartridge 202 as it is inserted through opening 218. In this manner, as filter cartridge 202 is moved towards the fully inserted position, resilient arm 240 contacts filter cartridge 202 at a contact point 272. According to the illustrated embodiment, contact point 272 may be positioned proximate a midpoint 274 of filter housing 210 as measured along a direction perpendicular to filter axis A. According to an alternative embodiment, contact point 272 may be positioned between midpoint 274 and a top wall 216 of filter housing 210. Notably, forming resilient arm 240 such that contact point 272 is positioned proximate midpoint 274 ensures that the spring force of resilient arm 240 acts in the desired direction.

Notably, filter locking member 230 is generally configured for both pivoting and flexing slightly when engaged by filter cartridge 202. In this regard, for example, locking arm 232 defines a first thickness 280 and resilient arm 240 defines a second thickness 282. According to an exemplary embodiment, first thickness 280 is greater than second thickness 282, e.g., to provide more rigidity to locking arm 232 while permitting resilient arm 240 to flex and provide a spring force to filter cartridge 202. For example, first thickness 280 may be approximately double second thickness 282 according to exemplary embodiments.

Notably, deformation of resilient arm 240 is preferably within the elastic region of the material used, such that it may return to an unflexed state when filter cartridge 202 is removed. However, when filter cartridge 202 is installed, it is desirable that resilient arm 240 remains deflected or flexed to secure filter cartridge 202 in the installed position.

According to an exemplary embodiment, filter housing 210 may be permanently fixed within refrigerator door 128 and may be formed from any suitable material. In addition, filter locking mechanism 230 may be formed from any material which is sufficiently rigid to retain filter cartridge 202 while permitting flexing as described above to secure filter cartridge 202. Specifically, for example, filter housing 210 and filter locking mechanism 230 may be formed by injection molding, e.g., using a suitable plastic material, such as injection molding grade high impact polystyrene (HIPS) or acrylonitrile butadiene styrene (ABS). Alternatively, according to the exemplary embodiment, filter housing 210 and filter locking mechanism 230 may be compression molded, e.g., using sheet molding compound (SMC) thermoset plastic.

Referring again to FIGS. 5 through 7, an exemplary process of installing filter cartridge 202 into filter housing 210 will be described. As shown in FIG. 5, as filter cartridge 202 is pressed against filter locking mechanism 230, angled surface 268 urges filter locking mechanism 232 pivot about pivot pin 242 (e.g., clockwise as illustrated in the figures). In this manner, filter cartridge 202 may be inserted at least partially through opening 218 of filter housing 210 until it just engages resilient arm 240 at contact point 272 (e.g. as shown in FIG. 5).

As the user continues to push filter cartridge 202 into filter housing 210 resilient arm 240 begins to deflect (e.g. undeflected position is shown in phantom in FIGS. 6 and 7). This deflection generates a spring force urging filter cartridge 202 back out of filter housing 210 while also urging filter locking mechanism 230 to press up on filter cartridge 202 (e.g., by rotating in the counterclockwise direction). If a user continues to push filter cartridge 202 into filter housing 210, resilient arm 240 continues to deflect until a backside of filter cartridge 202 clears retention clip 234. When this happens, as shown in FIG. 7, filter cartridge 202 snaps in place. In this regard, a top of filter cartridge 202 fits snugly between a top wall 216 of filter housing 210 and locking arm 232. In addition, resilient arm 240 continues to urge filter cartridge 202 against locking surface 266. Thus, filter cartridge 202 remains bounded and securely positioned within filter housing 210.

To remove filter cartridge 202, a user may simply press down on angled surface 268 of retention clip 234 until locking surface 266 no longer engages filter cartridge 202, at which time resilient arm 240 urges filter cartridge 202 back out of filter housing 210. Thus, the construction of filter housing 210 and filter locking mechanism 230 is uniquely configured to receive filter cartridges 202 and secure them in place without permitting any rattling or undesirable movement. In addition, removal of filter cartridge 202 (e.g. after the filter media is exhausted) is quick and simple.

As one skilled in the art will appreciate, the above described embodiments are used only for the purpose of explanation. Modifications and variations may be applied, and other configurations may be used, and the resulting configurations may remain within the scope of the invention. For example, filter assembly 200 may be positioned at any suitable location, filter housing 210 and filter cartridge 202 may have any suitable shapes, and filter locking mechanism 230 may operate in any other suitable manner. One skilled in the art will appreciate that such modifications and variations may remain within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
   a cabinet defining a chilled chamber;
   a door being rotatably hinged to the cabinet to provide selective access to the chilled chamber; and
   a filter assembly comprising:
      a filter housing for receiving a filter cartridge;
      a filter locking mechanism positioned at least partially within the filter housing for securing the filter cartridge, the filter locking mechanism comprising a locking arm defining a retention clip for securing the filter cartridge and a resilient arm that extends from the locking arm; and
      a pivot pin that is rotatably mounted to the filter housing, wherein the locking arm and the resilient arm extend from the pivot pin at an extension angle of less than 90 degrees.

2. The refrigerator appliance of claim 1, wherein the extension angle is approximately 75 degrees when the filter locking mechanism is in a relaxed position.

3. The refrigerator appliance of claim 1, wherein the filter housing defines a plurality of alignment ribs, at least two of the plurality of alignment ribs defining mounting holes for rotatably receiving the pivot pin.

4. The refrigerator appliance of claim 1, wherein the filter housing defines a plurality of alignment ribs for guiding the filter cartridge into the filter housing.

5. The refrigerator appliance of claim 4, wherein each of the alignment ribs defines at least one filleted corner for guiding the filter cartridge during installation.

6. The refrigerator appliance of claim 1, wherein the filter locking mechanism is rotatable within the filter housing through a pivot angle, the pivot angle being less than about 15 degrees.

7. The refrigerator appliance of claim 1, wherein the locking arm is spaced apart from the filter housing.

8. The refrigerator appliance of claim 1, wherein the retention clip extends from a distal end of the locking arm, the retention clip defining a locking surface that is oriented perpendicular to the locking arm and an angled surface facing away from the filter housing for engaging the filter cartridge.

9. The refrigerator appliance of claim 1, wherein the resilient arm is curved to define a convex surface facing the filter cartridge.

10. The refrigerator appliance of claim 9, wherein the resilient arm first contacts the filter cartridge at a contact point, the contact point being between a midpoint and a top of the filter housing.

11. The refrigerator appliance of claim 1, wherein the resilient arm is configured for flexing when engaged by the filter cartridge.

12. The refrigerator appliance of claim 11, wherein the resilient arm remains deflected when the filter cartridge is in a latched position.

13. The refrigerator appliance of claim 1, wherein the locking arm defines a first thickness and the resilient arm defines a second thickness, the first thickness being greater than the second thickness.

14. The refrigerator appliance of claim 1, wherein the filter cartridge has a substantially rectangular cross section.

15. The refrigerator appliance of claim 1, wherein the filter assembly is mounted within the door of the refrigerator appliance.

16. A filter assembly for an appliance, the filter assembly comprising:
   a filter housing for receiving a filter cartridge;
   a filter locking mechanism positioned at least partially within the filter housing for securing the filter cartridge, the filter locking mechanism comprising a locking arm defining a retention clip for securing the filter cartridge and a resilient arm that extends from the locking arm; and
   a pivot pin that is rotatably mounted to the filter housing, wherein the locking arm and the resilient arm extend from the pivot pin at an extension angle of less than 90 degrees.

17. The filter assembly of claim 16, wherein the retention clip extends from a distal end of the locking arm, the retention clip defining a locking surface that is oriented perpendicular to the locking arm and an angled surface facing away from the filter housing for engaging the filter cartridge.

18. The filter assembly of claim 16, wherein the resilient arm is curved to define a convex surface facing the filter cartridge, and wherein the resilient arm first contacts the filter cartridge at a contact point, the contact point being between a midpoint and a top of the filter housing.

19. The filter assembly of claim 16, wherein the resilient arm is configured for flexing when engaged by the filter cartridge and remaining deflected when the filter cartridge is in a latched position.

20. A filter assembly for an appliance, the filter assembly comprising:
   a filter housing for receiving a filter cartridge; and
   a filter locking mechanism positioned at least partially within the filter housing for securing the filter cartridge, the filter locking mechanism comprising a locking arm defining a retention clip for securing the filter cartridge and a resilient arm that extends from the locking arm at an extension angle of less than 90 degrees, wherein the resilient arm is configured for flexing when engaged by the filter cartridge.

* * * * *